R. M. GATES & V. MAYHEW.
MOTOR VEHICLE.
APPLICATION FILED MAR. 2, 1918.
1,285,676.
Patented Nov. 26, 1918.
2 SHEETS—SHEET 2.
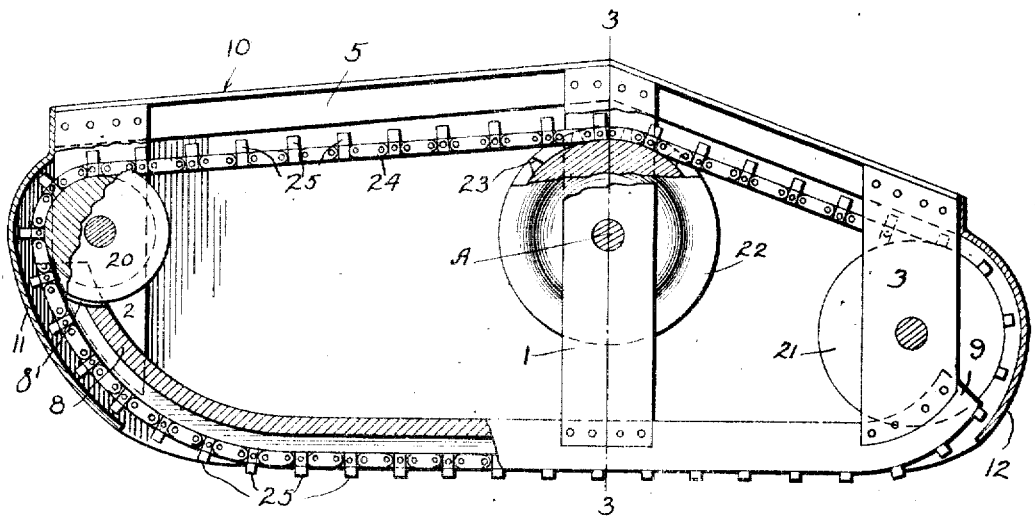
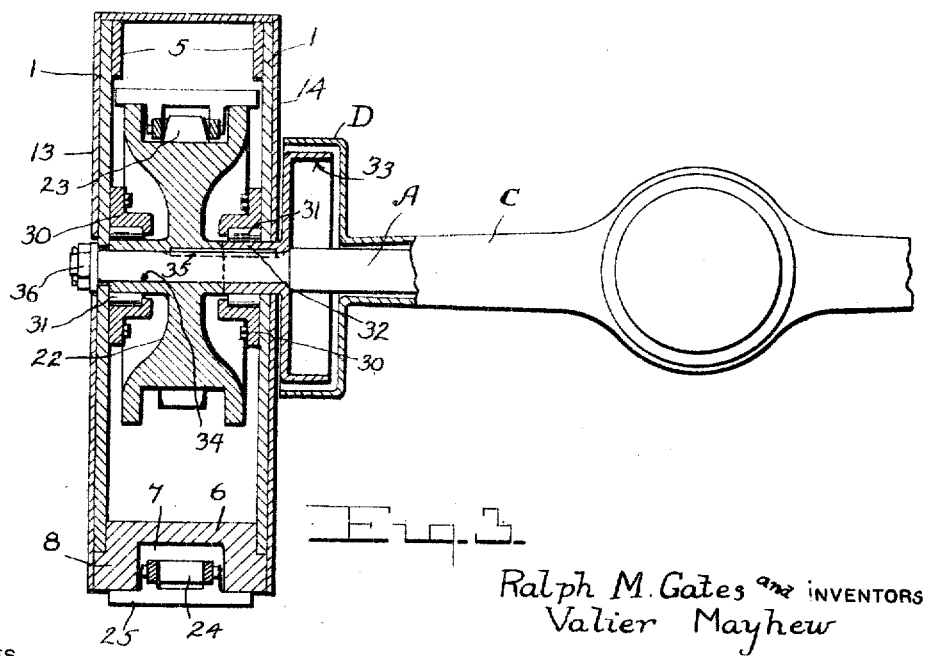
Ralph M. Gates and Valier Mayhew INVENTORS
WITNESSES
BY
ATTORNEY

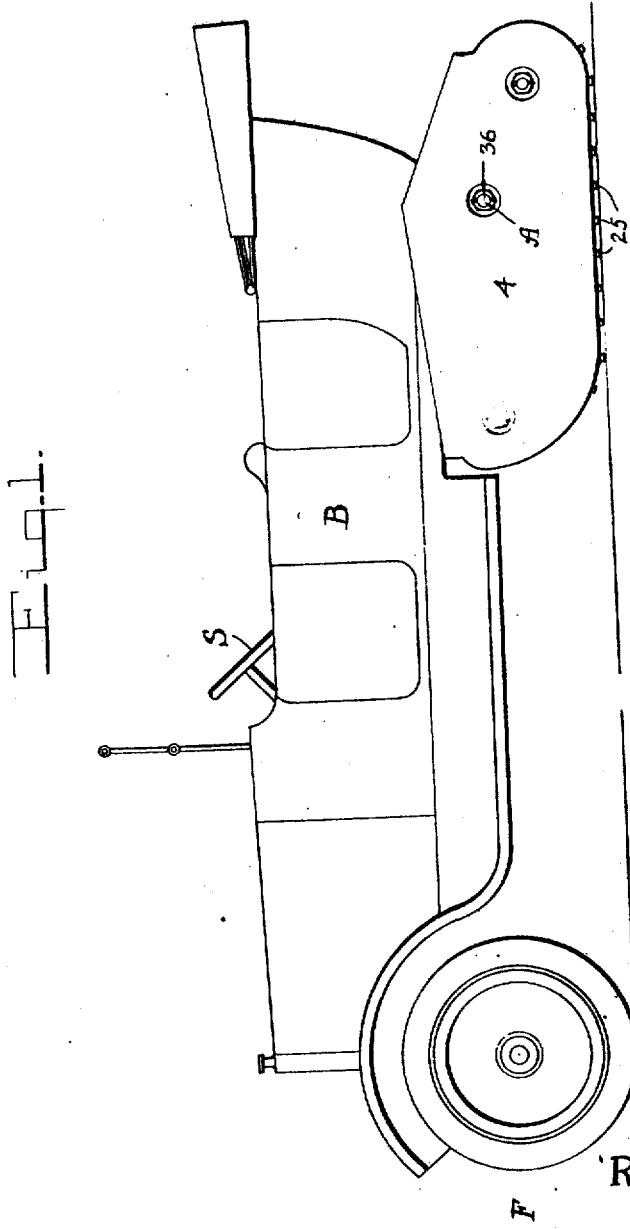
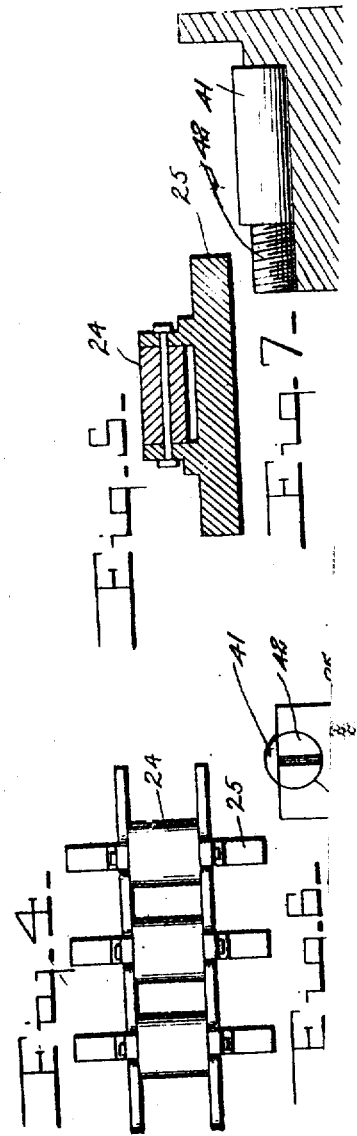

UNITED STATES PATENT OFFICE.

RALPH M. GATES AND VALIER MAYHEW, OF GREAT BEND, NEW YORK.

MOTOR-VEHICLE.

1,285,676.   Specification of Letters Patent.   Patented Nov. 26, 1918.

Application filed March 2, 1918. Serial No. 220,101.

*To all whom it may concern:*

Be it known that we, RALPH M. GATES and VALIER MAYHEW, citizens of the United States, residing at Great Bend, in the county of Jefferson and State of New York, have invented certain new and useful Improvements in Motor-Vehicles, of which the following is a specification.

This invention relates to motor vehicles, and more especially it contemplates the substitution for the ordinary driving wheels of tractors in the shape of runners having chains moved around their periphery by the driving mechanism, so as to increase the traction of the vehicle on the roadway.

Details of the manner in which the invention is carried out are set forth in the following specification, reference being had to the drawings, in which:—

Figure 1 is a side elevation of an automobile equipped with this improvement,

Fig. 2 is an enlarged side elevation of one of the runners with its nearer side plate removed and part of the remainder in section, and Fig. 3 is a vertical section through Fig. 2 on about the line 3—3, and an elevation of the rear or driving axle of the vehicle, Figs. 4 and 5 are details showing the construction of the tractor chains.

Figs. 6 and 7 are respectively an end elevation and a longitudinal section of a modified form of chain-links.

The vehicle body is designated in Fig. 1 by the letter B and the front wheels are indicated at F, steered as usual at S. In fact, we have illustrated an automobile with the rear or driving wheels removed, but of course it might be a motor truck of any appropriate construction which it was desired to employ and to which our attachment is to be applied. For this purpose the rear or driving wheels are removed entirely from the axle A, which with its casing C and the brake drum housing D, is shown in Fig. 3. The grip of a driving wheel upon the surface is only at the point where such wheel touches it. We propose to increase the traction by enlarging the point of grip, and the manner in which we do so will now be explained.

Uprights 1, 2, and 3, at the mid-length, front and rear ends, carry the framework of a runner-shaped structure broadly indicated by the reference number 4, and whose size and shape should be such that it may be substituted for the rear or driving wheel, with or without the rear fenders although we have shown them removed in Fig. 1. To the upper ends of these uprights are attached strips 5 and to their lower ends tracks 6 which are channeled as at 7 as seen in Fig. 3. The general shape of the strips and tracks in side elevation is seen in Fig. 2, and is not very important, excepting that we would have the front ends of the tracks curve upward as seen at 8 on rather gentle lines of curvature, and their rear ends 9 curve upward rather more sharply. Both ends are split as seen at 8' in Fig. 2 to admit the idler wheels. The front and rear uprights 2 and 3 should be attached to the tracks at these points of curvature so as to maintain them in proper position. The runner structure includes an appropriate top plate 10, and front and rear guards 11 and 12 which extend down part way beneath the curved portions 8 and 9 of the track, but leave the channels 7 of the latter open throughout the full length of its straight portion for a purpose yet to appear. Finally side plates 13 and 14 are applied as seen in Fig. 3, and the parts are all connected in any suitable and appropriate manner.

Between the front uprights is journaled an idler 20, and between the rear uprights another idler 21, these being wheels with flat or grooved peripheries as desired, consistent with the shape of the chains yet to be described. Between the intermediate uprights is located a driving sprocket 22 whose teeth 23 engage with the links of a chain 24 which is led over the sprocket and around both idlers and along through the channel 7 of the track 6 as best seen in Fig. 2. The chain is housed and protected throughout its entire course by the casing of the runner 4, excepting where it passes along the channel at the bottom of the same, as will be clearly understood. The construction of this chain may well be left to the manufacturer, but we prefer that it shall be made up of links as well shown in Fig. 4, each link carrying a roller 24 at its inner side and a cross bar 25 at its outer side to engage or embed the earth or snow over which the same passes. The teeth 23 of the driving sprocket 22 project between the rollers to avoid friction. It is also quite possible that these rollers may be so disposed that they will travel in the bottom of the channel 7 along the lower stretch of the track 6, and if so much friction will be avoided at this point. However, it might be said in general, that the character of the chain employed will depend upon the character of the motor vehicle to which the invention is applied and the work expected of it.

As first suggested above, this attachment is applied to the axle of an ordinary automobile by first removing its driving wheel entirely. The side plates of the runner casing and the uprights 1 are pierced at appropriate points with openings through which the axle spindle is passed, and around these openings within the runner structure are bearings indicated by the numerals 30 and 31 in Fig. 3. These bearings may well be of the ball type, or in larger machines of the roller type. The inner bearing surrounds the neck 32 of the brake drum 33 which fits loosely within the brake housing D on the axle casing C. The outer bearing fits around the extended hub 34 of the driving sprocket 22. The brake drum neck and the hub of the sprocket are keyed as at 35 on the axle spindle, and after all parts are assembled a nut 36 is applied to the outer end thereof as shown. It will now be seen that, when the driving wheel is removed, this attachment can be immediately applied to the axle spindle in place of the same. It is put onto the spindle from the end, and the nut 36 holds all parts in place. The front and rear idler wheels serve to keep the chain in working position within the runner casing or housing. As soon as power is applied to the main axle A, the sprocket 32 rotates in the proper direction to cause the chain to travel around within the runner, and its cross bars 25 to move along the surface of the roadway, whether the latter be dry, muddy, or icy. Not only will the chain reliably engage said surface but it will have increased traction by reason of the length of the engagement in both distance and time. Therefore the efficacy of such a vehicle is increased, even though weather conditions are unfavorable.

In Figs. 6 and 7 is shown a modified form of chain-links wherein the same cross bar 25 may be employed, but at each extremity we bore a cavity 40 opening through the upper side of the cross bar and into this we pass a roller bearing broadly designated by the numeral 41, the same being held in place by a screw plug 42. We speak of "roller bearing" in the sense that the portion which projects above the cross bar 25 may be a roller, a ball or a plurality of balls; the purpose is to have this rolling element, bear upwardly against the track at both sides of the channel 7 therein, as perhaps better seen in Fig. 3, leaving the main roller 24 free from weight and intended only to make anti-friction contact with the teeth of the several sprocket wheels.

We might say in conclusion that, whereas we have shown front wheels F in Fig. 1, it is quite possible to replace them with runners so that the entire vehicle may be mounted on runners and no wheels at all will be used in contact with the surface.

What is claimed as new is:—

1. In an attachment of the type described, the combination with a sprocket and two idlers, a runner-like casing therefor made up of intermediate and end uprights, a track connecting their lower ends and channeled along its bottom, top and side plates, and front and rear guards inclosing the idlers beyond the channeled track; of a chain passing over the sprocket and around the idlers and along said channel, bearings within said runner casing at the ends of the hub of the sprocket, the side plates of such casing having openings alining with said bearings whereby the spindle of the driving shaft of an automobile may be passed through said openings and bearings and the hub of the sprocket, and means for detachably fastening the spindle in place.

2. In an attachment of the type described, the combination with a runner-like casing made up of intermediate and end uprights, strips along their upper ends, a track connecting their lower ends and channeled along its bottom, the ends of the track being bent upward and being split, top and side plates, and front and rear guards rising above said split ends of a sprocket journaled between the intermediate strips, idlers journaled between the other strips and standing in the splits of the track, a chain passing over the sprocket and around said idlers and along said channel, and means for detachably connecting the sprocket with the driving mechanism of a motor vehicle.

In testimony whereof we affix our signatures in presence of two witnesses.

RALPH M. GATES.
VALIER MAYHEW.

Witnesses:
 FRED GATES,
 FRANCIS X. ZAPF.